United States Patent [19] [11] 4,338,568
Yang [45] Jul. 6, 1982

[54] METHOD AND DEVICE FOR DETECTION OF A SUBSTANCE

[76] Inventor: Robert A. Frosch, Administrator of the National Aeronautics and Space Administration, with respect to an invention of Lien C. Yang, La Canada, Calif.

[21] Appl. No.: 135,038

[22] Filed: Mar. 28, 1980

[51] Int. Cl.$^3$ .............................................. G01R 5/28
[52] U.S. Cl. .................................. 324/466; 73/861.05
[58] Field of Search ............... 73/28, 861.05; 324/464, 324/466, 467, 71 CP; 313/93

[56] References Cited

U.S. PATENT DOCUMENTS

| | | | |
|---|---|---|---|
| 2,783,647 | 3/1957 | Stuart | 73/861.05 |
| 3,028,490 | 4/1962 | Guilleux | 313/93 |
| 3,559,049 | 1/1971 | Liebermann | 324/464 |
| 3,827,217 | 8/1974 | Volsy | 324/71 CP |
| 4,090,308 | 5/1978 | Stuck | 324/464 |

*Primary Examiner*—Michael J. Tokar
*Attorney, Agent, or Firm*—Paul F. McCaul; John R. Manning

[57] ABSTRACT

A method and device for detecting the presence of a substance having predetermined characteristics. More particularly, a device is disclosed wherein a discharge grid (20) is provided having a sufficiently high voltage potential across its grid electrodes (32 and 36) so that the substance having the predetermined characteristics will cause an electric spark discharge to occur between electrodes, the electric spark discharge altering the predetermined characteristics of the substance by oxidation and/or vaporization so that the substance is no longer detectable by an electric spark discharge. A means for counting the number of electric spark discharges is provided (96), a count providing an indication of the concentration of the substance having the predetermined characteristics. One embodiment disclosed detects longitudinally extending carbon fibers suspended in a gaseous medium (12). Another embodiment provides for the detection of carbon fibers (66) adhesively attached to a collection tape (68). The tape is positioned against the discharge grid (70) and a high voltage is periodically applied across the grid electrodes (71 and 72) until electric spark discharges no longer occur.

16 Claims, 7 Drawing Figures

METHOD AND DEVICE FOR DETECTION OF A SUBSTANCE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

TECHNICAL FIELD

The invention relates to devices for detecting the presence of a substance having predetermined characteristics.

BACKGROUND ART

The invention relates to devices for detecting the presence of a substance having predetermined characteristics.

There has been a rapid growth in the use of carbon fiber composites, such as carbon fibers in an epoxy matrix, in civil aircraft markets and vehicular transportation systems. Recently, a significant hazard has been recognized that could ultimately prevent the widespread use of such materials even though they have desirable characteristics of high strength and stiffness relative to weight. This hazard occurs as a result of fires in which the epoxy matrix is consumed. The carbon fibers, which are electrically conductive, are neither oxidized or vaporized at the temperatures experienced during typical fires, and are expelled from the matrix and entrained in air to form aerosols which can travel considerable distances. The fibers can invade or settle in unprotected electrical or electronic equipment and, being conductive, can cause shorting, power failure and even blackouts. Automobile fires are common events and aircraft fires occur frequently. Fires in which carbon fiber composites are involved are often near airports, industrial or residential areas where shorting of electrical or electronic equipment could have life-endangering consequences.

Efforts are under way to overcome the recognized electrical hazards created by the burning of carbon fiber composites. The ultimate goal is to prevent release of fiber fragments from composites in a fire situation without sacrificing or compromising the proven good features of such composites. Several approaches have been and are currently being investigated in connection with such efforts. These approaches include gasifying the fibers, and clumping, retaining or insulating them to eliminate electrical conductivity. Essential to the success of these efforts is some quantitative test which provides an objective determination of the number of carbon fibers released during a fire. That is, some test is needed for quantifying the fiber release characteristics of modified composite materials in comparison with other composite materials. Several techniques are known in the prior art, all of which have certain disadvantages. A brass ball technique has been utilized in which the ball is charged by a high voltage power supply to about 1-2 kilovolts through a high impedance limiting resistor connected in parallel to a small capacitor. The charged ball thus attracts the fiber fragments in a flow stream. Upon contact with each fiber, the capacitance of the ball is changed, thus altering the characteristics of an electrical signal. The altered characteristics are correlatable to fiber length. Disadvantages of the technique are that the resultant signal is weak and amplification by sophisticated electronics is needed, the resultant signal is affected by strong electrical noise, fiber capture efficiency is low and dependent upon the flow velocity of the air containing the fibers, and the results are sensitive to moisture and soot in the flow stream. A low voltage grid system has also been utilized to detect the airborne fibers. This system utilizes parallel brass rods to form a grid supported by an insulation frame. The adjacent rods are biased by a low DC voltage typically around 15 volts. The fibers cause an electrical current to flow as they are collected by the grid, thereby producing an electrical signal related to fiber concentration. Problems with this system include loss of sensitivity due to fiber accumulation on the grid, a low count efficiency due to fibers passing through the grid, and ambiguities due to different contact resistances between the various fibers and the grid. Another conventional fiber detection system utilizes an optical scanner having a light source such as an LED or laser beam which is incident on a photodiode device. When air containing the fibers is passing between the light source and the photodiode device, the shadow of the fibers creates an electrical signal. A difficulty with the system is that it cannot differentiate fiber from soot or dust particles in the air. Another conventional system irradiates the airborne fibers by a laser beam, and measures backscattering from the fibers. This system is also subject to inaccuracies created by soot in the air. The present invention solves most of the disadvantages of the above systems by providing a means for detecting the presence of a fiber having predetermined dimensional characteristics.

STATEMENT OF THE INVENTION

The invention provides a device for detecting the presence of a substance having predetermined characteristics, the device including a means for detecting the presence of the substance by an electric spark discharge initiated by the substance. In addition, the invention provides a method for detecting the presence of a substance having predetermined characteristics, the method including the steps of locating the substance in a predetermined detection location, and detecting the presence of the substance when located in the predetermined detection location. The step of detecting includes the steps of generating an electric spark discharged in contact with the substance, thereby altering the substance's predetermined characteristics, and indicating the number of electric spark discharge occurrences, the number then being related to the number of times a substance having the predetermined characteristics is located in the predetermined detection location.

In a specific embodiment of the invention, the means for detecting the presence of the substance includes a discharge grid formed of a first plurality of interconnected elongated grid elements, electrodes or conductors interpositioned with respect to a second plurality of interconnected elongated grid elements. A relatively high voltage potential is applied across the first and second pluralities of grid elements, the voltage potential being of sufficient magnitude that the presence of the substance, which could be a carbon fiber, will cause an electric spark discharge to occur across two of the grid elements. The electric spark discharge alters the predetermined characteristics of the substance, either through oxidation and/or vaporization, so that it can no longer cause an electric spark discharge to occur. A means for counting the number of electric spark discharges is also provided, the number being related to the substance density of the sample being tested.

In accordance with another embodiment of the invention for detecting the presence of carbon fibers, the carbon fibers are adhesively attached to a backing material. The backing material is positioned on the discharge grid so that they contact the grid elements. A means is provided for repetitively applying a voltage potential across the grid elements, the number of electric spark discharges occurring being related to the number of fibers attached to the backing material. This embodiment can be utilized when the grid is at a central testing location and the fibers are to be collected at a remote location.

BEST MODE FOR CARRYING OUT THE INVENTION

Detailed illustrative embodiments of the invention disclosed herein exemplify the invention and are currently considered to be the best embodiments for such purposes. They are provided by way of illustration and not limitation of the invention. Various modifications thereof will occur to those skilled in the art, and such modifications are within the scope of the claims which define the present invention.

As previously explained, a device for detecting the presence of a substance having predetermined characteristics is disclosed, the device including a means for detecting the substance by generating an electric spark discharge initiated by the presence of the substance. The electric spark discharge effectively alters the characteristics of the substance so that it cannot initiate another electric spark discharge. In a specific embodiment, a discharge grid is provided having a voltage potential across its grid elements which is sufficiently high to cause an electric spark discharge to be initiated by the presence of the substance to be detected. However, the voltage potential is not high enough to cause an electric spark discharge to occur in the absence of the substance to be detected. Many types of substances can be detected by an apparatus provided by the invention, one specific substance described in the exemplary embodiments being carbon fibers. The only required characteristic of a substance to be detected is that it have some degree of electrical conductivity.

Figure 1:
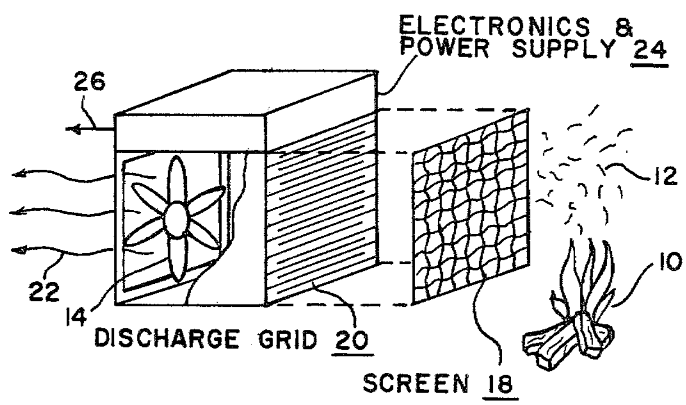
FIG. 1 is a partially cut-away, exploded perspective view of a first embodiment of a fiber detecting device provided by the invention.

Referring to FIG. 1, a fire 10 of an epoxy resin containing carbon fibers is shown wherein a plurality of carbon fibers 12 are released into the atmosphere. The carbon fibers 12 are drawn by a fan 14 through a screen 18 and a discharge grid 20. Those fibers not detected by the discharge grid 20, as will be explained below, are exhausted into the atmosphere as represented by the arrow shown at 22. An electronics and power supply unit 24 is provided for providing a bias voltage to the grid and for counting electric spark discharges initiated by the presence of the fibers, the unit 24 having an output signal shown at 26 which is related to the number of electric spark discharges. In operation, the carbon fibers 12 are drawn by the fan 14 to the screen 18. The screen 18 is chosen to have a mesh size that will tend to filter carbon fibers having a length greater than a predetermined length. It should be recognized that the filtering effect of the screen 18 is dependent upon the longitudinal orientation of the fibers 12 when they reach the screen, and that some fibers greater than the predetermined length will not be stopped. The purpose of the screen 18 is to insure that carbon fibers having a length greater than twice the spacing between the grid elements or conductors defining the grid 20 will not reach the grid, thereby minimizing the possibility of two electric spark discharges being created by a single carbon fiber. In a manner to be explained below, when a fiber reaches the grid 20, and has a length sufficiently long to short two adjacent grid elements having a relatively high voltage potential therebetween, an electric spark discharge is initiated by the fiber which alters the characteristics of the fiber through oxidation and/or vaporization, thereby eliminating the possibility of that fiber again initiating an electric spark discharge. The electronics and power supply unit 24 provides the relatively high voltage potential between adjacent grid elements, and includes circuitry for determining the number of electric spark discharges that have been initiated. This number of electric spark discharges is thus related to the number of fibers released by the fire 10.

Before proceeding with a further description of the first embodiment, it is appropriate to describe the characteristics of an electric spark discharge initiated by a carbon fiber. When the carbon fiber makes initial contact with two grid elements having a relatively high voltage potential therebetween, the voltage potential will overcome the contact resistance between the carbon fiber and the grid elements by forming arcs around the points of contact. When this occurs, current begins to flow through the fiber. However, the fiber greatly limits the current flow due to its relatively high resistance. Because the arc resistance of air under a high voltage is much smaller than that of a fiber of the same length, the initial arcs at the contact points tend to grow along the surface of the fiber until they completely bridge the two grid elements along the direction of the fiber. However this bridging will occur only if a high current condition is allowed by either the power supply or an appropriate discharge circuit. The peak arc resistance of the spark is in the order of several ohms. Emperical testing has shown that immediately after appearance of the electric spark discharge, a low current flows within the fiber itself and heats the fiber up to a high temperature. The direction of the electric spark discharge has been determined to follow that of the fiber. Thus the carbon fiber is an electric spark discharge initiator as well as guide for the spark. A fiber subjected to such an electric spark discharge usually has its characteristics altered so that it cannot cause another electric spark discharge. Thus the occurrence of an electric spark discharge indicates that a fiber of required length was present, and that that fiber will not support another electric spark discharge. This alteration provides a self-cleaning mechanism for the grid and insures that the same fiber will not be detected twice. It is theorized that alteration of the fiber characteristics is due to two mechanisms related to the electric spark discharge in an atmospheric environment. First, the plasma of the electric spark discharge has a high temperature which is theorized to be greater than 5,000 degrees Kelvin. Thus it heats the fiber surface to an extremely high temperature. The estimated thermal penetration depth in the fiber surface is of the order of 1 micrometer for the duration of the spark. This elevated temperature is sufficient to accelerate oxidation and gasification of the exterior surface of the fiber. The second possible alteration mechanism is plasma etching. The high energy ions and electrons in the plasma formed by the arc are capable of bombarding a solid surface in contact with it, thereby eroding portions of the surface. This process can remove a significantly thick layer of material from the surface, especially because the plasma of a spark possesses a high current and a high plasma density. The rate and degree of damage to the fiber can be accelerated by a higher voltage used in the discharge. This parameter as will be explained in further detail below, is utilized to match the particular fiber types to be detected.

Figure 2:
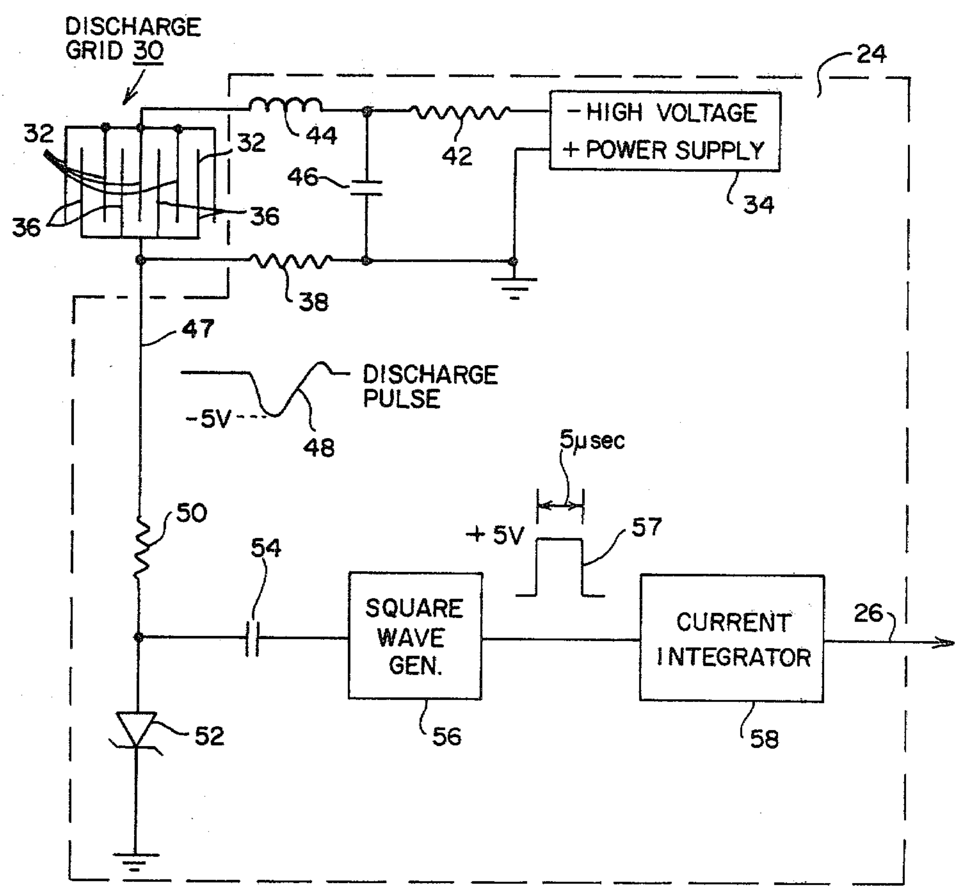
FIG. 2 is a block and schematic diagram of the electronics and power supply unit.

Referring now to FIG. 2 the electronics and power supply unit 24 is shown. A discharge grid 30, which corresponds to the discharge grid 20 shown in FIG. 1, is provided. The grid 30 includes a first plurality of interconnected grid elements comprising first electrodes or conductors 32 connected to the negative terminal of a high voltage power supply 34. A second plurality of interconnected grid elements comprising second electrodes or conductors 36 is connected through a dropping resistor 38 to ground. The positive terminal of the high power, high voltage power supply 34 is also connected to ground. The first and second interconnected conductors or teeth 32 and 36, respectively, are interpositioned so that each of the first conductors 32 and the second conductors 36 are spaced apart from each other an appropriate distance as will be explained below in order to detect carbon fibers having predetermined length characteristics. It has been found that gold plated brass electrodes have worked well for carbon fiber detection by allowing combustion products to pass through the discharge grid 30 without causing spurious shorts by soot and moisture. A discharge capacitor 46 is connected to ground and to the negative terminal of the high voltage power supply 34 through a current limiting resistor 42 in series with the negative terminal of the high voltage power supply 34 and the first plurality of electrodes 32. Distributed circuit inductance is schematically shown at 44. The circuit elements are chosen to maintain an optimized high voltage differential across the interconnected conductors 32 and 36. The discharge capacitor 46 is chosen to provide transient high currents as each fiber contacting the interconnected conductors 32 and 36 initiates an electric spark discharge.

In operation, when the grid elements 32 and 36 are not shorted, a negative voltage potential is created across the discharge capacitor 46. This voltage potential is developed at a rate determined by the time constant of the current limiting resistor 42 and discharge capacitor 46 combination. When a carbon fiber shorts the grid elements 32 and 36, thereby causing an electric spark discharge to occur between the elements as previously explained, a negative going pulse is generated on a line 47 connected to the second electrodes 36. The magnitude of this pulse is determined by the value of the dropping resistor 38. The power supply 34, current limiting resistor 42, and discharge capacitor 46 are chosen so that the discharge capacitor 46 is charged to substantially the same negative voltage as the high voltage power supply 34 output at a rate ten times greater than the anticipated fiber detection rate. For very high anticipated detection rates the high voltage power supply 34 would have to have a high current output capacity.

An advantage of having a high voltage potential across the grid elements 32 and 36 is that the carbon fibers are attracted to the elements because of the high voltage potential existing between them. It is theorized that this is due to electrostatic and/or electromagnetic fields set up near the grid which may produce a dipole effect in the fibers themselves. Therefore the fibers show a tendency to become naturally aligned across the grid elements. This effect promotes fiber capture and sequential counting. As previously explained, the presence of a fiber across two of the grid elements merely facilitates an electric spark discharge by providing a low resistance path for the electric spark discharge. The current discharge in the spark is far greater than the current conducted through the fiber for the applied voltage and alters the fibers characteristics through vaporization and/or oxidation as previously explained. Even when the fiber bridges the gap in a nonperpendicular orientation, the electric spark discharge follows the fiber orientation, theoretically because of the lower resistance path provided by the fragment. It has also been empirically found that only one discharge occurs at any instant, even though many fibers are incident on the same sensing element at the same time. It is theorized that on a statistical basis it is highly unlikely that more than one path as defined by the fiber orientation would have exactly the same resistance as a path defined by another fiber incident on the grid elements at the same instant. Thus the arcing or electric spark discharge process will proceed sequentially starting with the fiber defining a path of least resistance. Because of this, it is believed that the electric spark discharge-produced current flow is only for a single fiber at one time, and does not result from the combined lower resistance effect of several fibers.

Referring again to FIG. 2, a negative discharge pulse 48 appearing on line 47 is provided through a dropping resistor 50 to a zener diode 52, and through a blocking capacitor 54 to a square wave generator 56. The zener diode 52 is provided so that any positive overshoots of the discharge pulse are shorted to ground, thereby providing only a negative pulse through the blocking capacitor 54 to the square wave generator 56. The square wave generator 56 is chosen to be of the type that provides a square wave output pulse 57 having a predetermined amplitude and duration characteristic for each input pulse. Thus the characteristics of the output pulse 57 from the square wave generator 56 are independent of the characteristics of the discharge pulse 48. A current integrator 58 is provided, the output of the current indicator 58 being indicative of the total current generated by the square wave generator output pulses 57. Thus the value of the output signal 26 from the current integrator 58 corresponds to the number of electric spark discharges that have occurred across the grid elements 32 and 36. Of course, a digital counter could be utilized in lieu of the square wave generator 56 and current integrator 58, the counter providing an indication of the number of electric spark discharges that have occurred.

Figure 3:
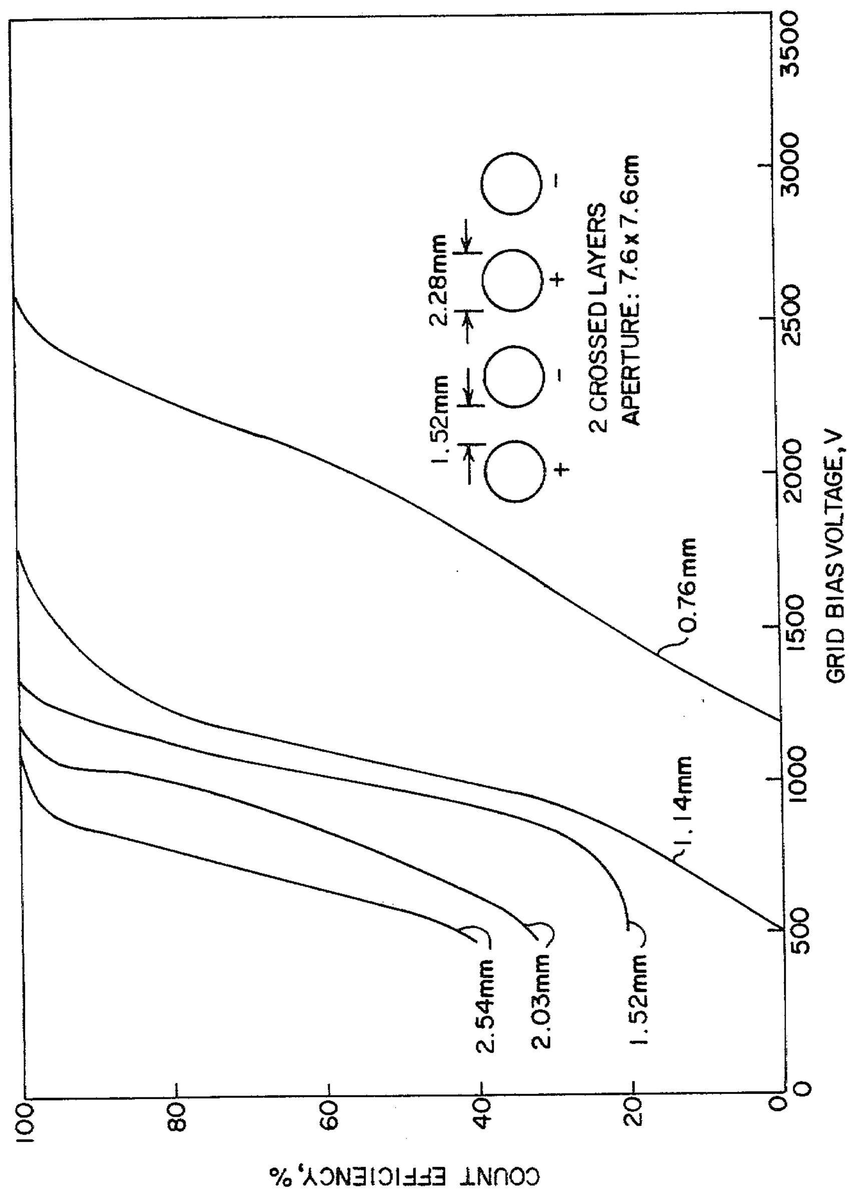
FIG. 3 is a graph showing carbon fiber count efficiency as a function of grid bias voltage and fiber length for rounded grid elements spaced apart 1.52 millimeters.
Figure 4:
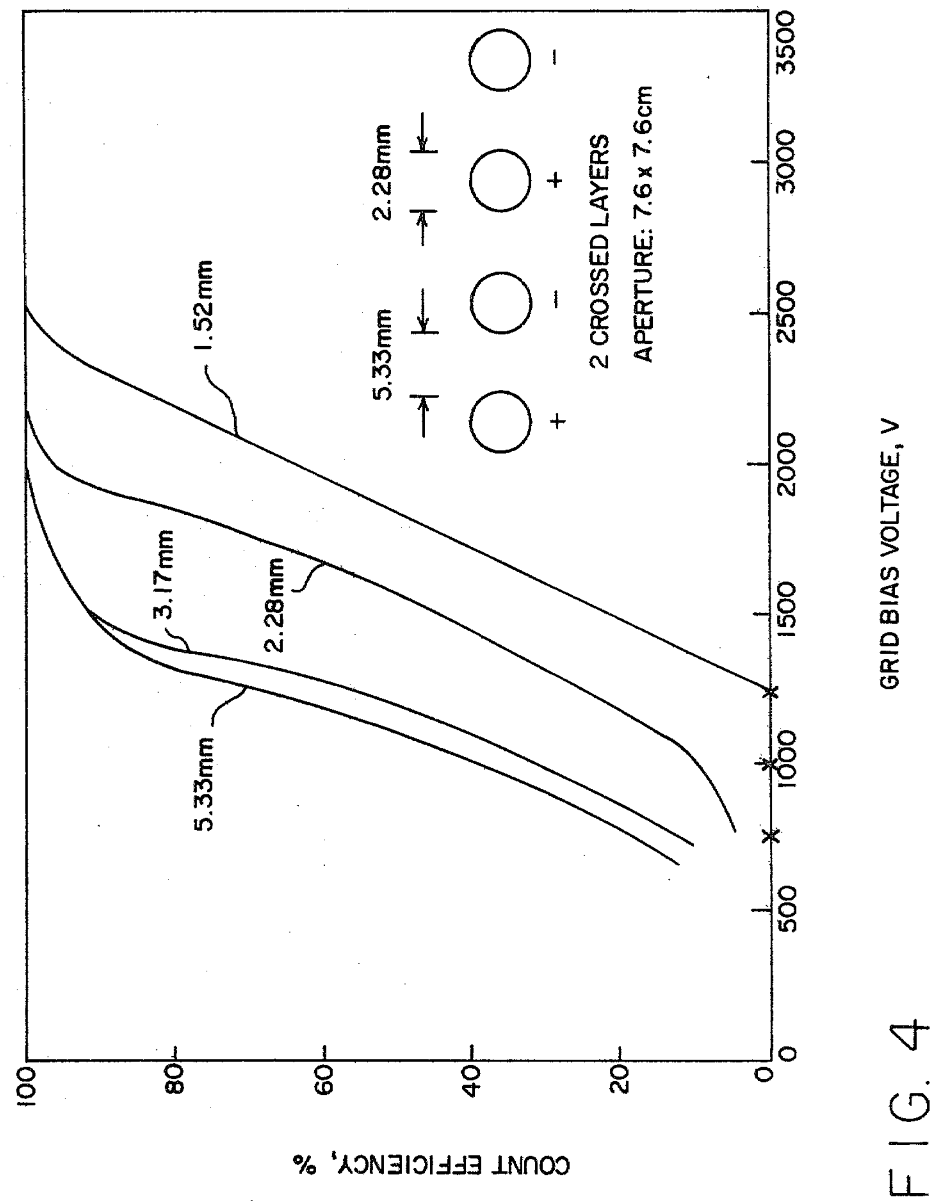
FIG. 4 is a graph showing carbon fiber count efficiency as a function of grid bias voltage and fiber length for round grid elements spaced apart 5.33 millimeters.

As previously indicated, the count efficiency based upon fiber length is partially determined by the grid bias voltage and the cross-sectional and spacing characteristics of the grid elements. Referring to FIG. 3, it can be seen that grid elements having circular cross-sections and spaced apart from each other by 1.52 millimeters result in approximately 20% of fibers 1.52 millimeters in length being detected for a 500 volt grid bias voltage. Approximately all of these fibers will be counted if the grid bias voltage is increased to 1500 volts. Similarly, if the grid bias voltage is increased to approximately 2700 volts, all fibers greater than 0.76 millimeters will be counted even though it is impossible for some of the fibers to contact two grid elements simultaneously. In FIG. 4, grid elements having a circular cross-section the same as those shown in FIG. 3, are spaced apart 5.33 millimeters. Here it can be seen that all of the 1.52 millimeter fibers can be counted if the grid bias voltage is increased to approximately 2600 volts.

Figure 5:
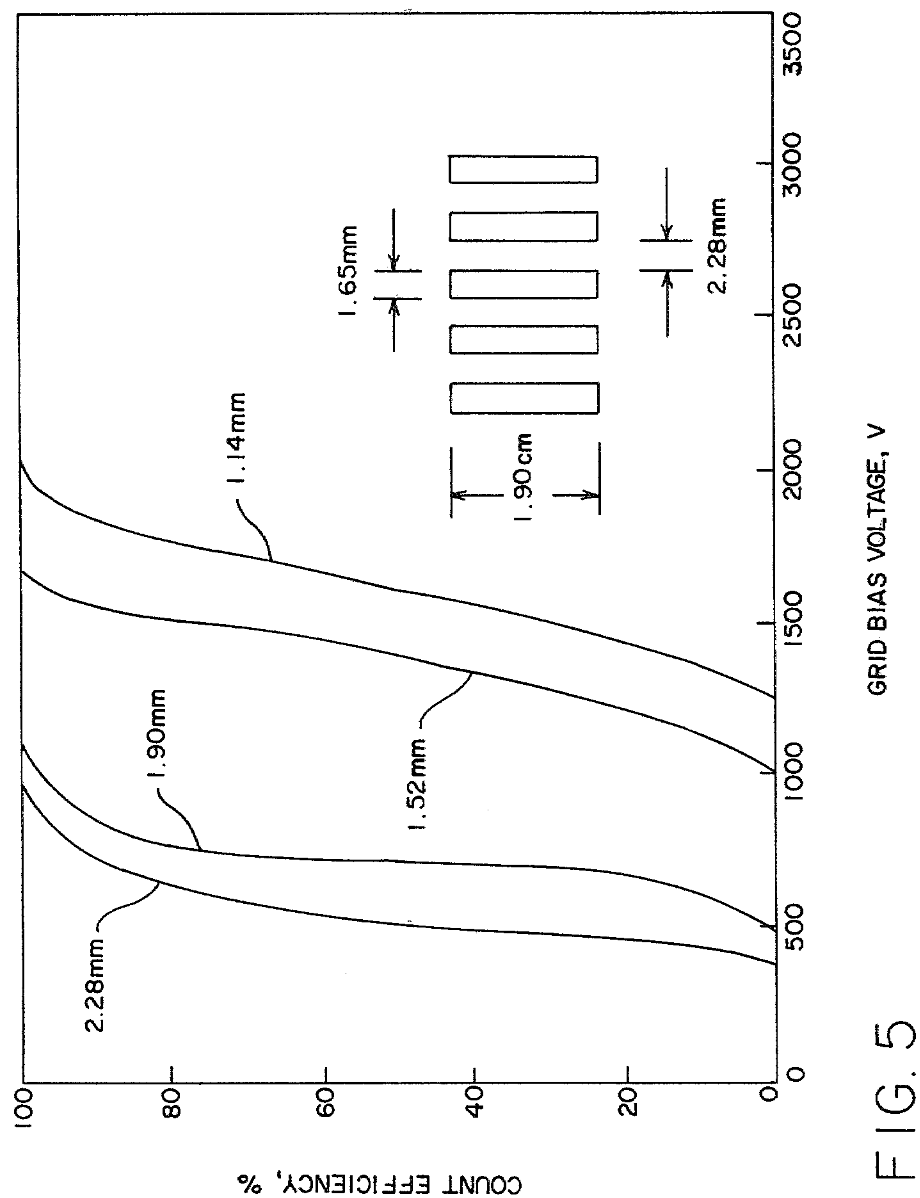
FIG. 5 is a graph showing carbon fiber count efficiency as a function of grid bias voltage and fiber length for rectangular grid elements spaced apart 2.28 millimeters.
Figure 6:
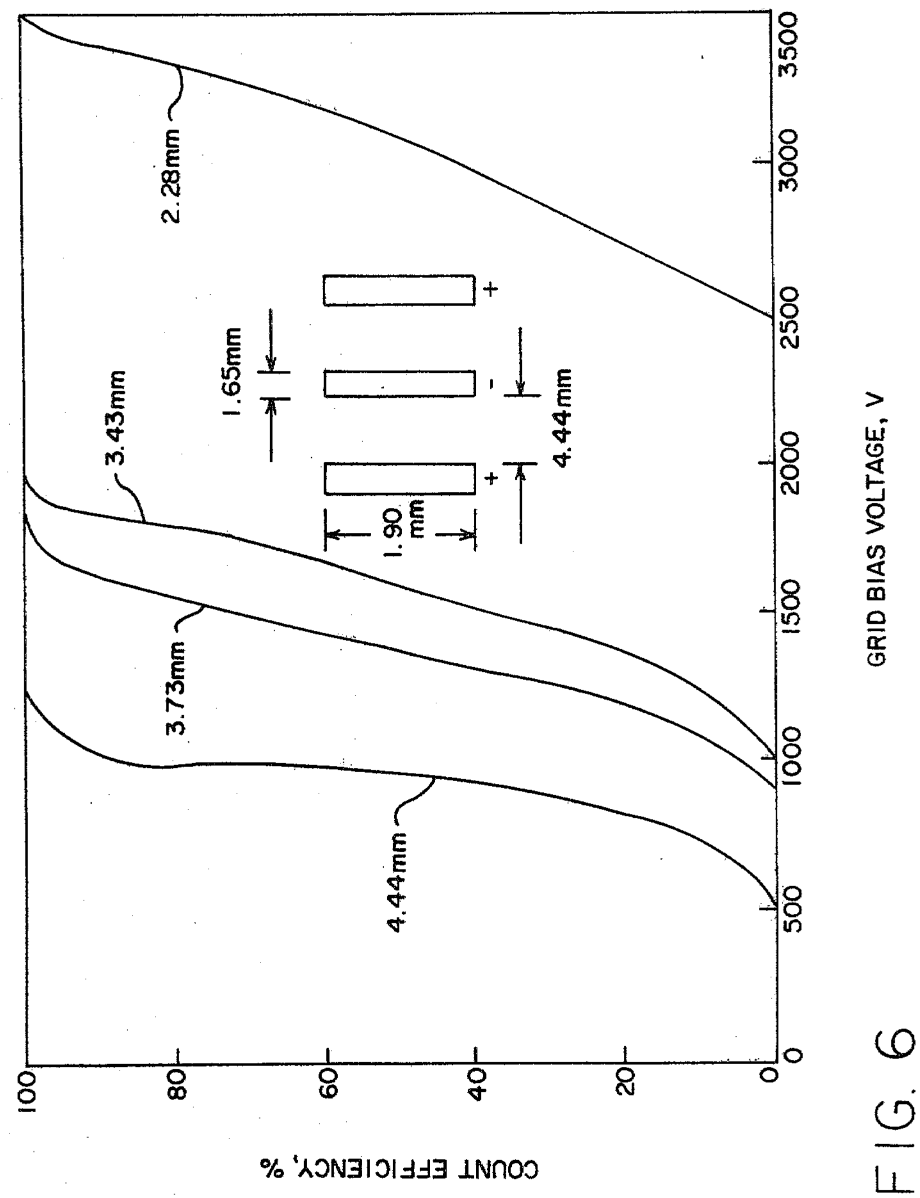
FIG. 6 is a graph showing carbon fiber count efficiency as a function of grid bias voltage and fiber length for rectangular grid elements spaced apart 4.44 millimeters.

It has been found that count efficiency and discrimination between fibers having differing lengths can be increased by utilizing grid elements which are rectangular in cross-sectional areas. Referring to FIG. 5, an improved count efficiency and discrimination between fiber lengths can be seen. Discrimination between fibers of different lengths is related to the steepness of each curve as a function of grid bias voltage. For example, if the grid bias voltage is set at 1000 volts, almost all of the fiber lengths longer than 1.9 millimeters will be counted whereas very few of the fibers having a length less than 1.52 millimeters will be counted. However, most of the fibers less than half of the length of the 2.28 millimeter spacing between grid elements will be counted if the grid bias voltage is increased to 2000 volts. If the grid elements are spaced apart 4.44 millimeters as shown in FIG. 6, high count efficiencies and discrimination can also be achieved.

Figure 7:
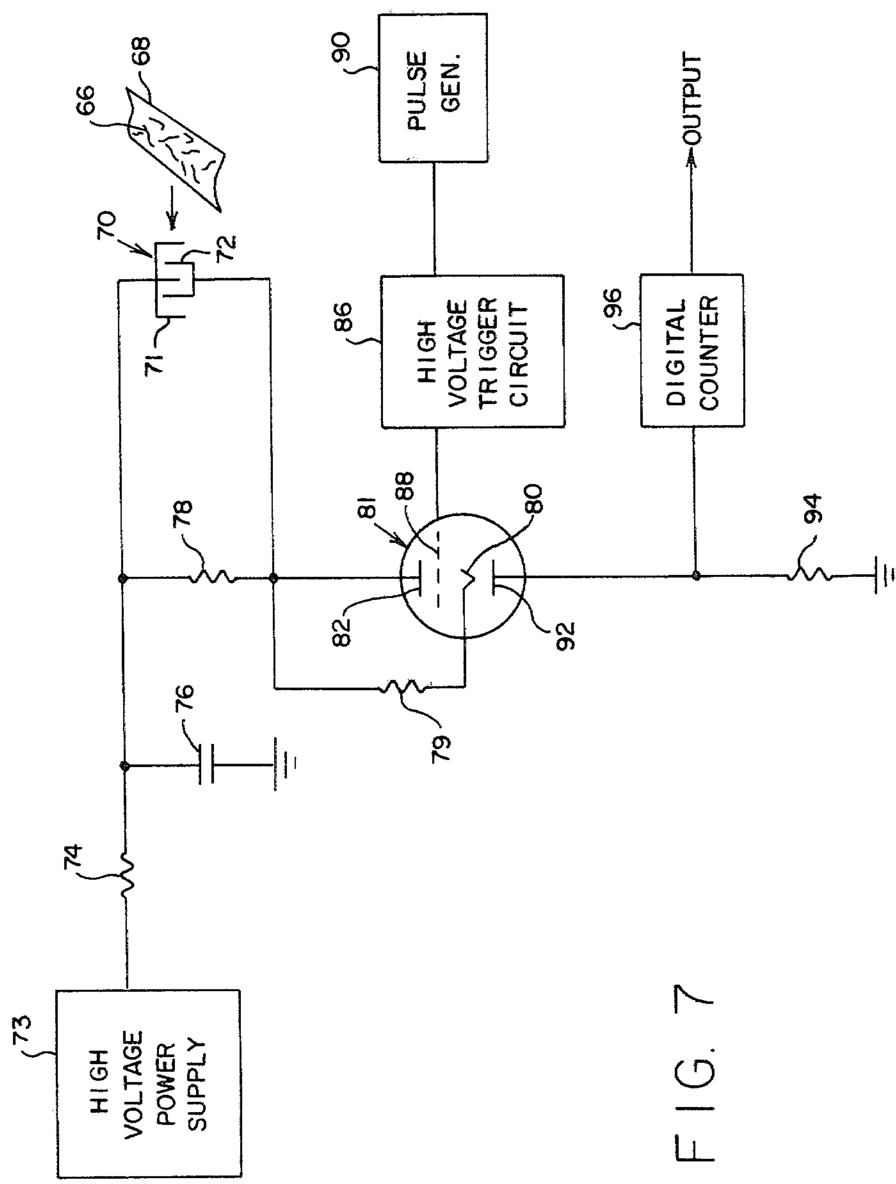
FIG. 7 is a block and schematic diagram of a fiber detector wherein the fibers are adhesively attached to a nonconductive backing material.

A further embodiment of the invention can be seen in FIG. 7. Here, the carbon fibers 66 are adhesively attached to a nonconductive backing material or collection tape 68. The tape 68 is located adjacent to the burning fiber-containing epoxy material, and the fibers are collected on the tape as the material burns. The purpose of this collection technique is to economically collect carbon fibers at a remote location on a large number of tapes for analysis at a centrally located facility. The tape 68 is positioned on a grid 70 having first and second sets of grid elements 71 and 72, respectively. A high voltage power supply 73 has an output voltage which is provided to the first set of grid elements 71 through a current limiting resistor 74. A discharge capacitor 76 is provided to supply the current surge required during an electric spark discharge initiated by one of the carbon fibers 66. The first set of grid elements 71 is interconnected to the second set of grid elements 72 through a connecting resistor 78 which in turn is connected through a current limiting resistor 79 to a control electrode 80 of a krytron tube 81 which could be an EG&G KN-22 krytron, or any other triggerable high voltage spark gap or switch. The anode 82 of the krytron 81 is also connected through the current limiting resistor 79 to the control electrode 80. A high voltage trigger circuit 86 is connected to a biasing grid 88 in the krytron tube 81. The high voltage trigger circuit 86 is controlled to trigger the krytron tube 81 at a predetermined rate by a pulse generator 90. The cathode 92 of the krytron 81 is connected through a resistor 94 to ground. The current limiting resistor could be chosen to be 22 megohms, and is much larger than the resistor 94 which could be 0.09 ohms. A digital counter 96 is also connected to the cathode 92. In operation, the tape 68 is positioned over the grid 70 so that the carbon fibers 66 are in contact with the various grid elements 71 and 72. However because of simultaneous placement of a plurality of fibers across the grid elements 71 and 72, it can be appreciated that the discharge capacitor 76 would not be able to accumulate a charge due to a continuous shorting action by the fibers 66. Thus it is essential that as soon as a fiber is detected by an electric spark discharge, the discharge capacitor 76 be allowed to fully charge up prior to the next electric spark discharge. The krytron tube 81 and the high voltage trigger circuit 86 operate to allow electric spark discharges to occur only during the time that the krytron tube is conducting. The high voltage trigger circuit 86, such as an EG&G TM-11 trigger circuit, generates up to 30 kilovolt pulses which cause the krytron 81 to conduct. However conduction can be caused by pulses as low as 2 kilovolts. This conduction effectively shorts the second set of grid elements 72 to ground through the resistor 94. As soon as this shorting occurs, the positive voltage potential present across the discharge capacitor 76 appears across the first and second set of grid elements 71 and 72. If a detectable fiber is present while the krytron tube 81 is conducting, an electric spark discharge occurs which causes a high current surge through the krytron which is detected and counted by the digital counter 96. The krytron 81 then stops conducting by removal of the trigger pulse from the high voltage trigger circuit 86, and the charge across the discharge capacitor 76 builds up at a rate related to the time constant defined by the current limiting resistor 74 and the discharge capacitor 76. The pulse generator 90 continues in a free running manner, and the digital counter 96 continues to count for each pulse output from the pulse generator 90 until all of the detectable fibers 66 have been identified by electric spark discharges.

What is claimed is:

1. A device for detecting the presence of particulate substance having predetermined characteristics, said device comprising:

first means responsive to said particulate substance for initiating an electric spark discharge as a result of said substance having a predetermined location with respect to said first means, said electric spark discharge altering said substance predetermined characteristics so that said altered substance will no longer cause an electric spark discharge to be generated; and second means for determining the number of electric spark discharges generated, the number being related to the number of times a substance having said predetermined characteristics has been present in said predetermined location.

2. The device of claim 1 wherein said substance comprises a plurality of electrically conductive fibers, said first means comprising:

at least two spaced-apart conductors; and means for applying a voltage potential across said two spaced-apart conductors, said voltage potential being sufficiently high that an electric spark discharge is generated between two of said spaced-apart conductors by one of said fibers touching at least one of said conductors.

3. The device of claim 2 wherein said at least two spaced-apart conductors comprise a discharge grid formed of a plurality of interconnected first conductors and a plurality of interconnected second conductors, said first and second conductors being interpositioned so that at least one of said first conductors is adjacent to two of said second conductors.

4. The device of claim 3 wherein said electrically conductive fibers are suspended in a gaseous medium, said device further comprising means for flowing said gaseous medium through said discharge grid.

5. The device of claim 4 further comprising screen means located in the flow of said gaseous medium for inhibiting passage of fibers longer than a predetermined length.

6. The device of claim 3 wherein said first and second conductors are elongated in shape and are substantially circular in cross-section.

7. The device of claim 4 wherein said first and second conductors are elongated in shape and are rectangular in cross-section.

8. The device of claim 2 wherein said electrically conductive fibers are carbon fibers.

9. The device of claim 1 wherein said second means comprises a counter for counting the number of electric spark discharges.

10. The device of claim 1 wherein said second means comprises:

means for generating a first voltage pulse corresponding to each of said electric spark discharges;

means responsive to said first voltage pulse for generating a second pulse having predetermined amplitude and duration characteristics; and means for generating a count signal related to the sum of the amplitude/duration products of each of said second pulses.

11. The device of claim 1 wherein said substance comprises a plurality of electrically conductive fibers adhesively attached to a backing material, said first means comprising:

at least two spaced-apart conductors; and means for repetitively applying a voltage potential across said two spaced-apart conductors, said voltage potential being sufficiently high that an electric spark discharge is initiated between two of said spaced-apart conductors by one of said fibers touching one of said conductors.

12. The device of claim 11 wherein said at least two spaced-apart conductors comprise a discharge grid formed of a plurality of interconnected first conductors and a plurality of interconnected second conductors, said first and second conductors being interpositioned so that at least one of said first conductors is adjacent to two of said second conductors.

13. The device of claim 1 wherein said substance comprises particles suspended in a gaseous medium, said means for generating comprising:

at least two spaced-apart conductors; and means for applying a voltage potential across said at least two spaced-apart conductors, said voltage potential being sufficiently high so that an electric spark discharge touching one of said particles is generated between two of said spaced-apart conductors.

14. The device of claim 13 wherein said at least two spaced-apart conductors comprise a discharge grid formed of a plurality of interconnected first conductors and a plurality of interconnected second conductors, said first and second conductors being interpositioned so that at least one of said first conductors is adjacent to two of said second conductors.

15. A device for detecting the presence of a substance having predetermined characteristics, said device comprising first means for generating a predetermined voltage potential, and second means for detecting the presence of said substance by an electric spark discharge of said predetermined voltage potential initiated by said substance said second means comprising a discharge grid formed of a first plurality of interconnected elongated teeth interpositioned with a second plurality of interconnected elongated teeth, and means for applying said predetermined voltage potential across said first plurality and said second plurality of elongated teeth whereby said electric spark discharge is initiated in response to said substance having a predetermined positional relationship with respect to said discharge grid.

16. The device of claim 15 wherein said substance comprises a carbon fiber.

* * * * *